US011029281B2

(12) United States Patent
Aritome et al.

(10) Patent No.: US 11,029,281 B2
(45) Date of Patent: Jun. 8, 2021

(54) DRIVE SCREW DEVICE, LIQUID DELIVERY MECHANISM, AND LIQUID DELIVERY METHOD

(71) Applicant: Hitachi High-Technologies Corporation, Tokyo (JP)

(72) Inventors: Katsuhiro Aritome, Tokyo (JP); Ryusuke Kimura, Tokyo (JP); Motohiro Yamazaki, Tokyo (JP); Go Nakajima, Tokyo (JP); Naomichi Kawasaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 68 days.

(21) Appl. No.: 16/333,258

(22) PCT Filed: Sep. 23, 2016

(86) PCT No.: PCT/JP2016/077925
§ 371 (c)(1),
(2) Date: Mar. 14, 2019

(87) PCT Pub. No.: WO2018/055714
PCT Pub. Date: Mar. 29, 2018

(65) Prior Publication Data
US 2019/0250125 A1    Aug. 15, 2019

(51) Int. Cl.
*G01N 27/447* (2006.01)
*B05C 7/08* (2006.01)
(Continued)

(52) U.S. Cl.
CPC ......... *G01N 27/44782* (2013.01); *B05C 7/08* (2013.01); *G01N 27/447* (2013.01);
(Continued)

(58) Field of Classification Search
CPC ............... B29C 45/50; B29C 45/5008; G01N 27/44743; G01N 27/44756;
(Continued)

(56) References Cited

U.S. PATENT DOCUMENTS 2,702,547 A * 2/1955 Glass ................ A61M 5/14546
604/155
4,576,057 A * 3/1986 Saari .................... F16H 25/2266
74/424.92
(Continued)

FOREIGN PATENT DOCUMENTS

JP      03-93455 A    4/1991
JP      05-144147 A   6/1993
(Continued)

OTHER PUBLICATIONS

Dictionary of Electrical Drive Technology by Stefan Hesse, Festo Didactic GmbH & Co. KG, 2005, 196 pages (Year: 2005).*
(Continued)

*Primary Examiner* — Alexander S Noguerola
(74) *Attorney, Agent, or Firm* — Mattingly & Malur, PC

(57) ABSTRACT

This drive screw device is provided with: a drive screw; a drive unit which causes the drive screw to rotate; a slider which moves along the drive screw by means of the rotation of the drive screw; and an external load which is provided on the drive screw and applies a rotational load to the drive screw. By this means it is possible to provide a drive screw device with which there is little pressure variation even if a frictional force varies.

14 Claims, 10 Drawing Sheets

(51) Int. Cl.
*B29C 45/50* (2006.01)
*G01N 1/14* (2006.01)

(52) U.S. Cl.
CPC . *G01N 27/44743* (2013.01); *G01N 27/44756* (2013.01); *B01L 2400/0421* (2013.01); *B29C 45/5008* (2013.01); *G01N 2001/1481* (2013.01)

(58) Field of Classification Search
CPC ..... G01N 27/44791; G01N 2001/1436; G01N 2001/1481
See application file for complete search history.

(56) References Cited

U.S. PATENT DOCUMENTS

| | | | |
|---|---|---|---|
| 4,931,041 A * | 6/1990 | Faeser | A61M 5/1456 128/DIG. 1 |
| 6,383,356 B1 * | 5/2002 | Hayashizaki | G01N 27/44704 204/455 |
| 2002/0003091 A1 | 1/2002 | Kojima et al. | |
| 2002/0077598 A1 * | 6/2002 | Yap | A61M 5/162 604/155 |
| 2005/0042138 A1 | 2/2005 | Ueda et al. | |
| 2006/0000714 A1 | 1/2006 | Kojima et al. | |
| 2006/0079833 A1 * | 4/2006 | Kobayashi | A61M 5/1456 604/65 |
| 2008/0296161 A1 | 12/2008 | Shoji et al. | |
| 2016/0153936 A1 | 6/2016 | Miyata et al. | |

FOREIGN PATENT DOCUMENTS

| | | |
|---|---|---|
| JP | 06-180417 A | 6/1994 |
| JP | 07-035051 A | 2/1995 |
| JP | 2001-281221 A | 10/2001 |
| JP | 2001-324473 A | 11/2001 |
| JP | 2005-098960 A | 4/2005 |
| JP | 2008-298670 A | 12/2008 |
| JP | 2009-168511 A | 7/2009 |
| WO | 2015/005048 A1 | 1/2015 |

OTHER PUBLICATIONS

Teledyne HL Series Syringe Pumps Installation and Operation Guide, rev. Feb. 2016 (Year: 2016).*
International Search Report (with English translation) and Written Opinion for PCT/JP2016/077925 dated Dec. 20, 2016.

* cited by examiner

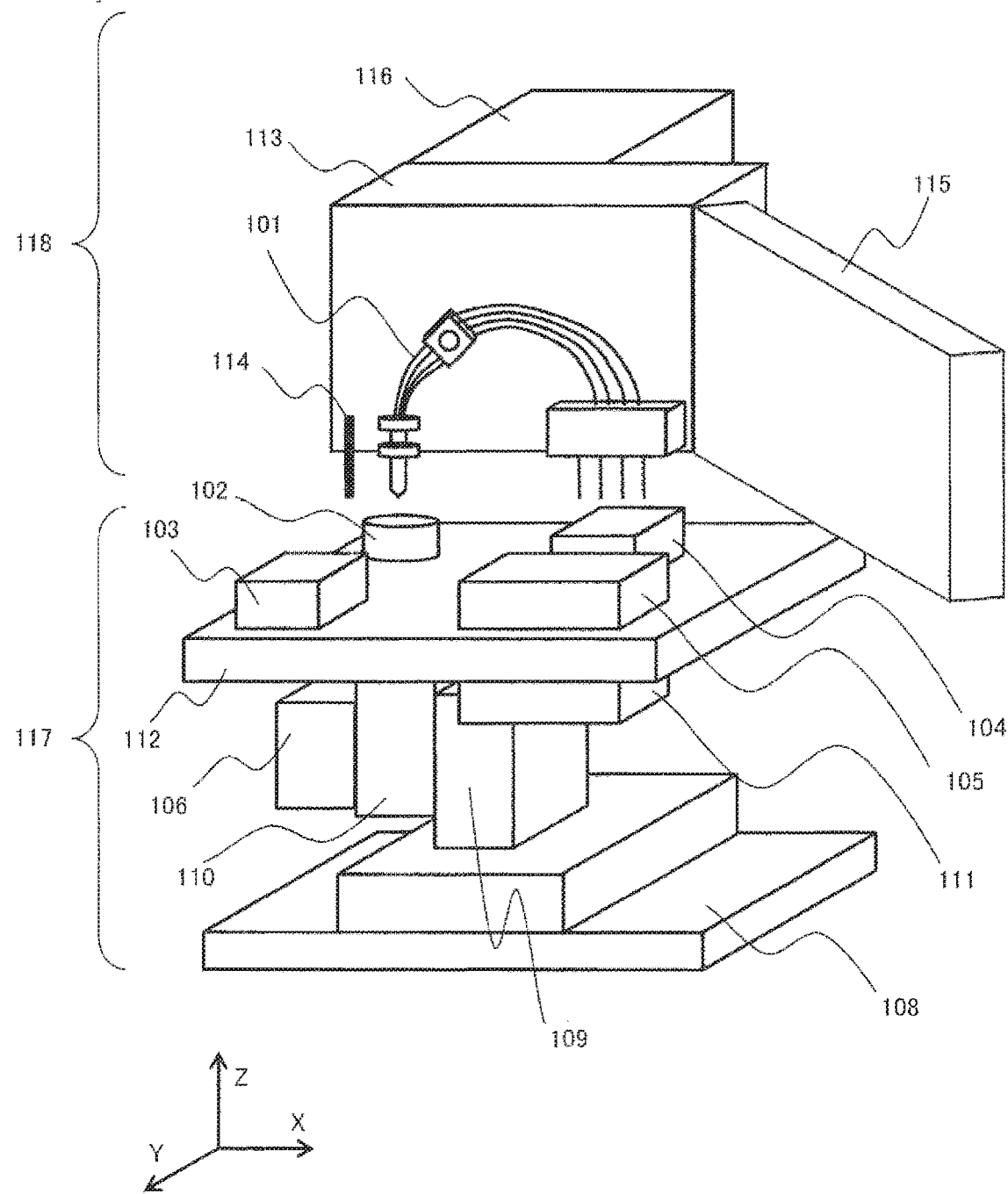
[FIG. 1]

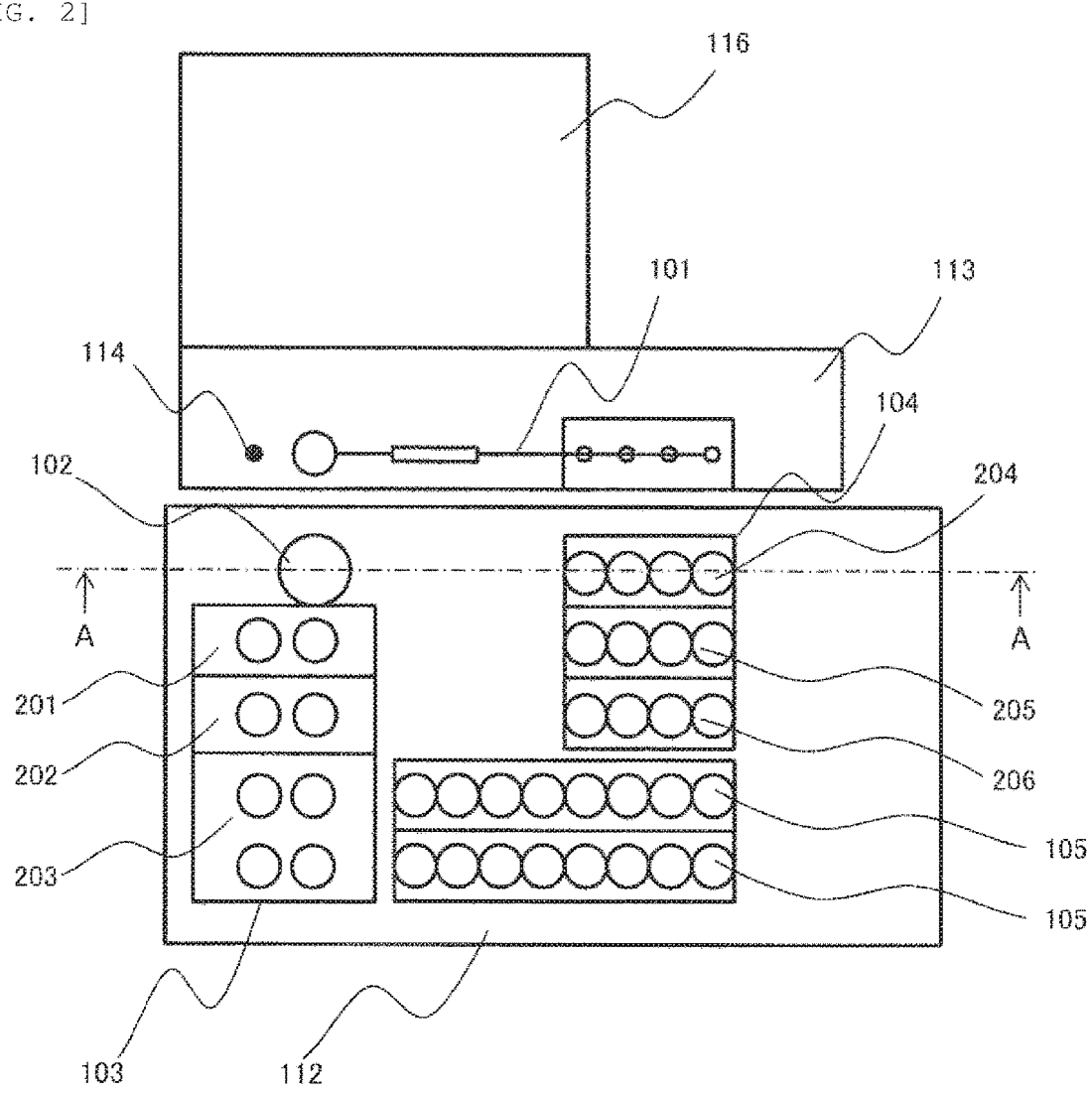
[FIG. 2]

[FIG. 3]
A-A
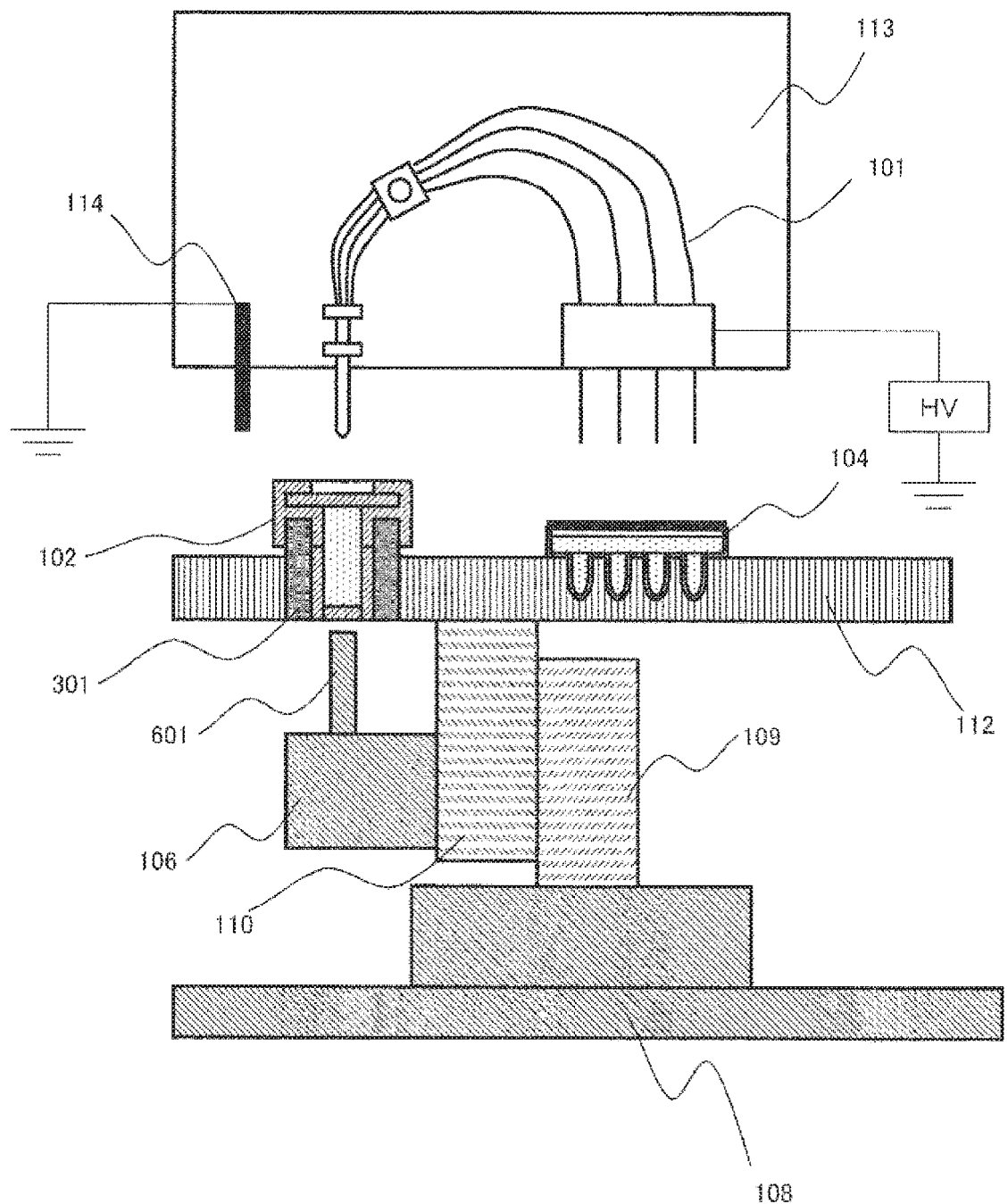

[FIG. 4]
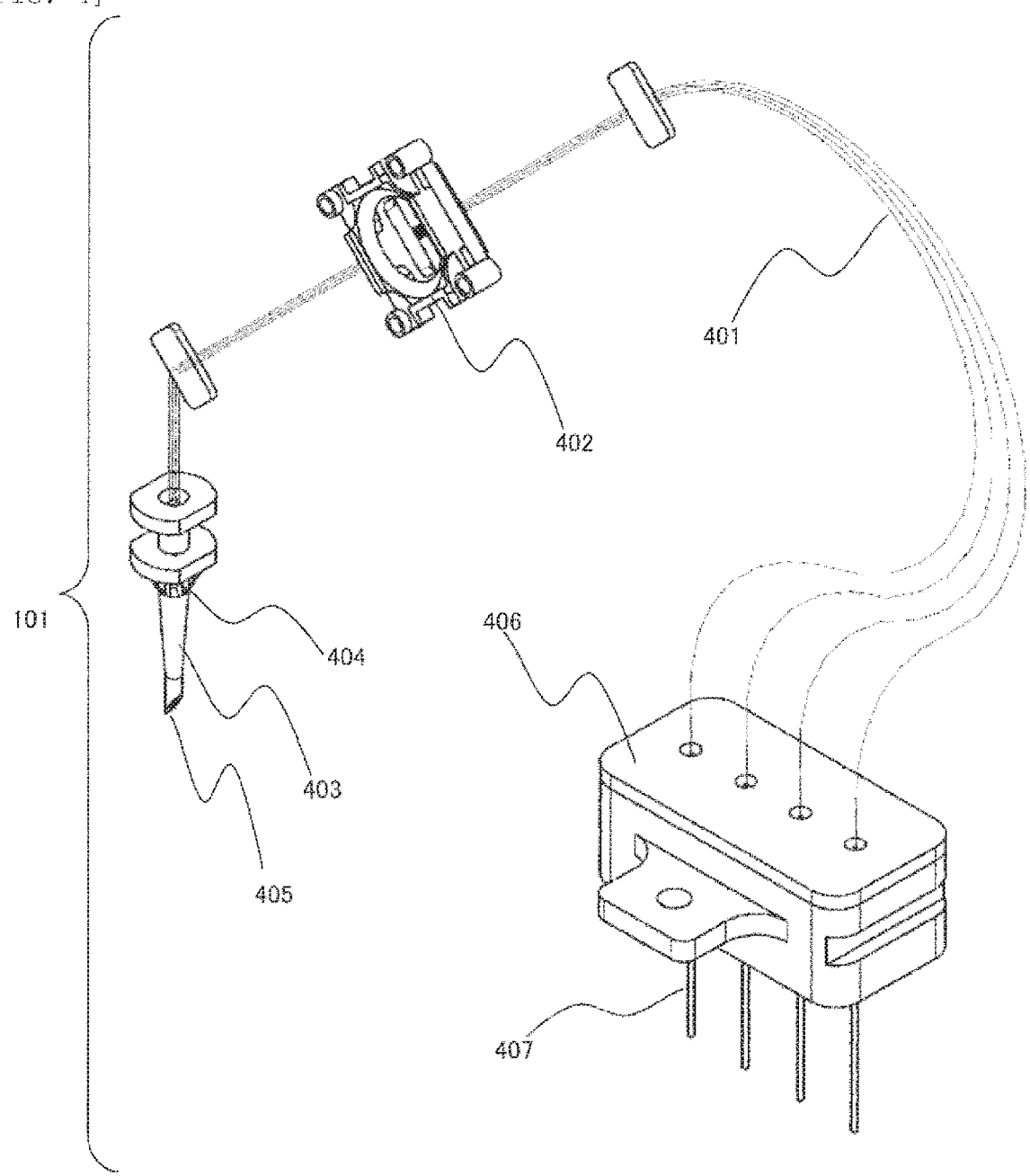

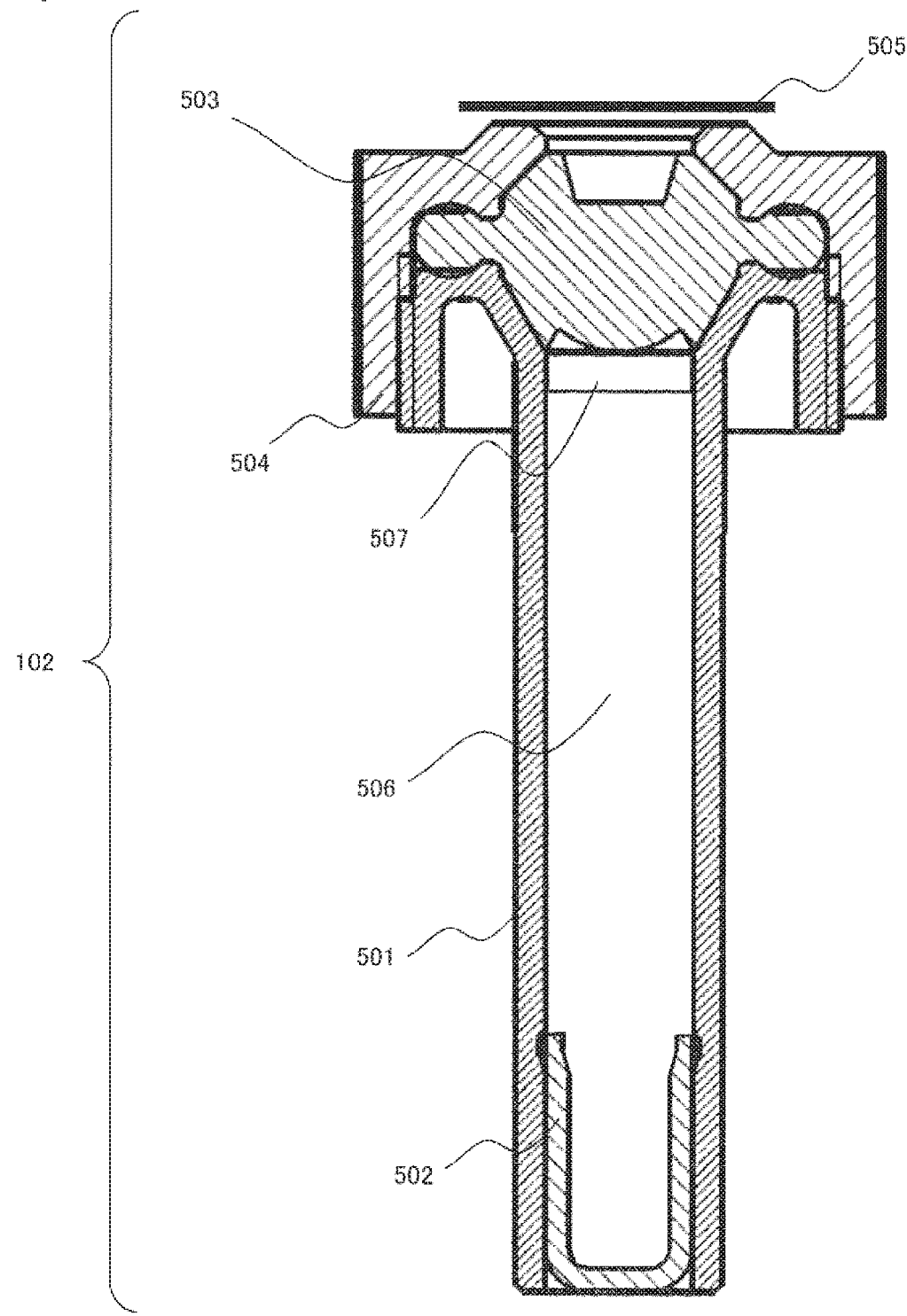
[FIG. 5]

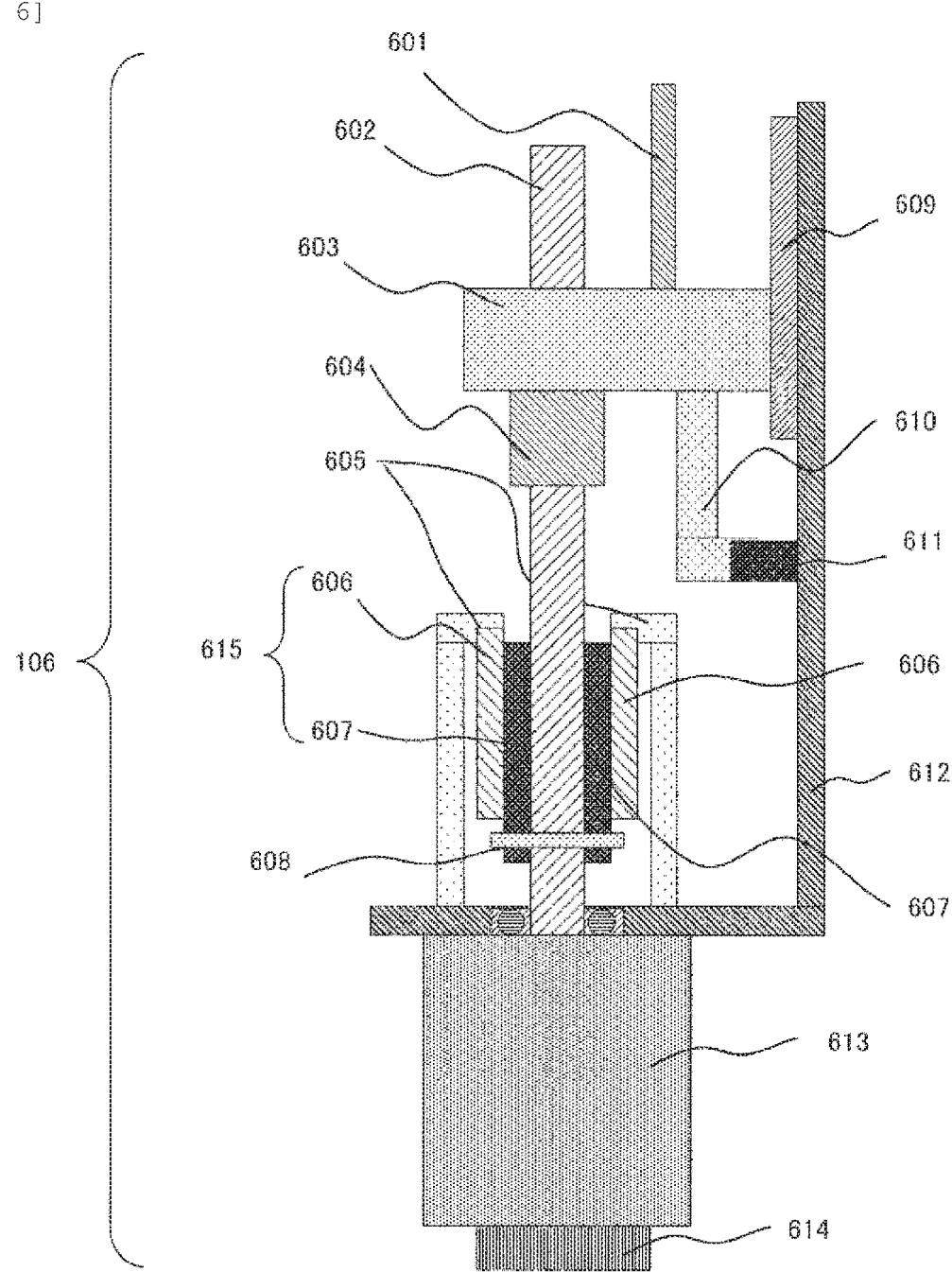
[FIG. 6]

[FIG. 7]
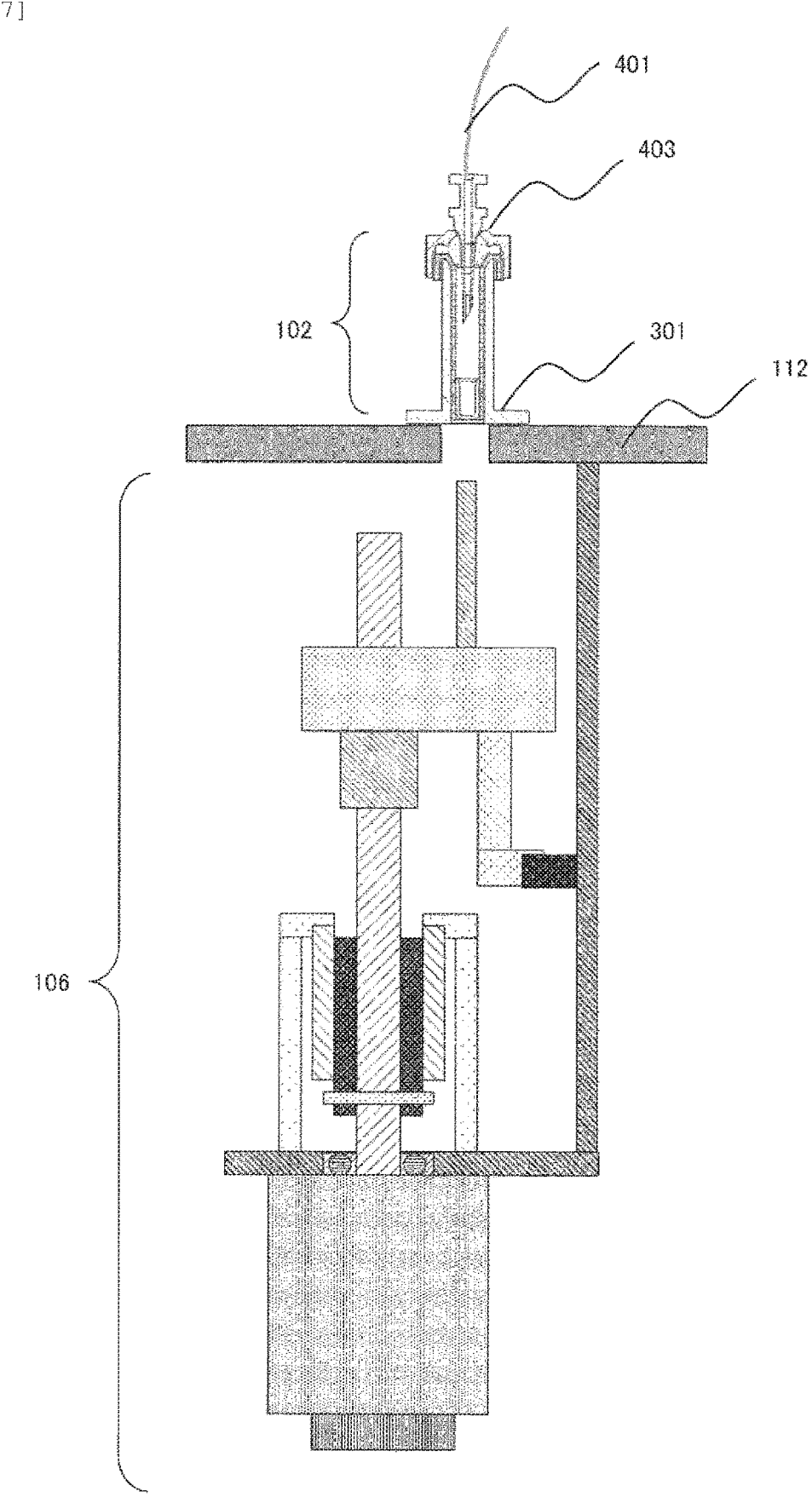

[FIG. 8]
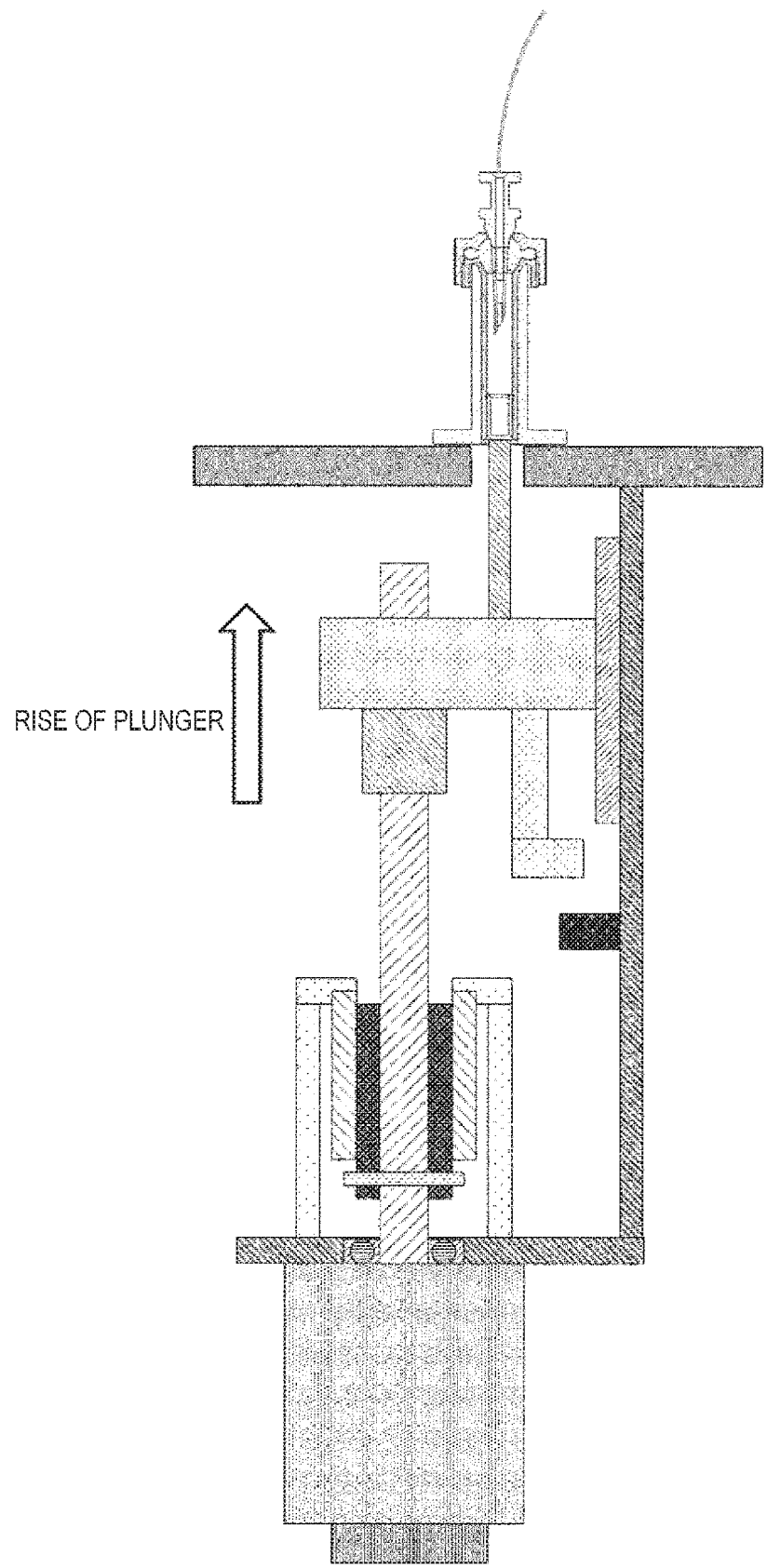

[FIG. 9]
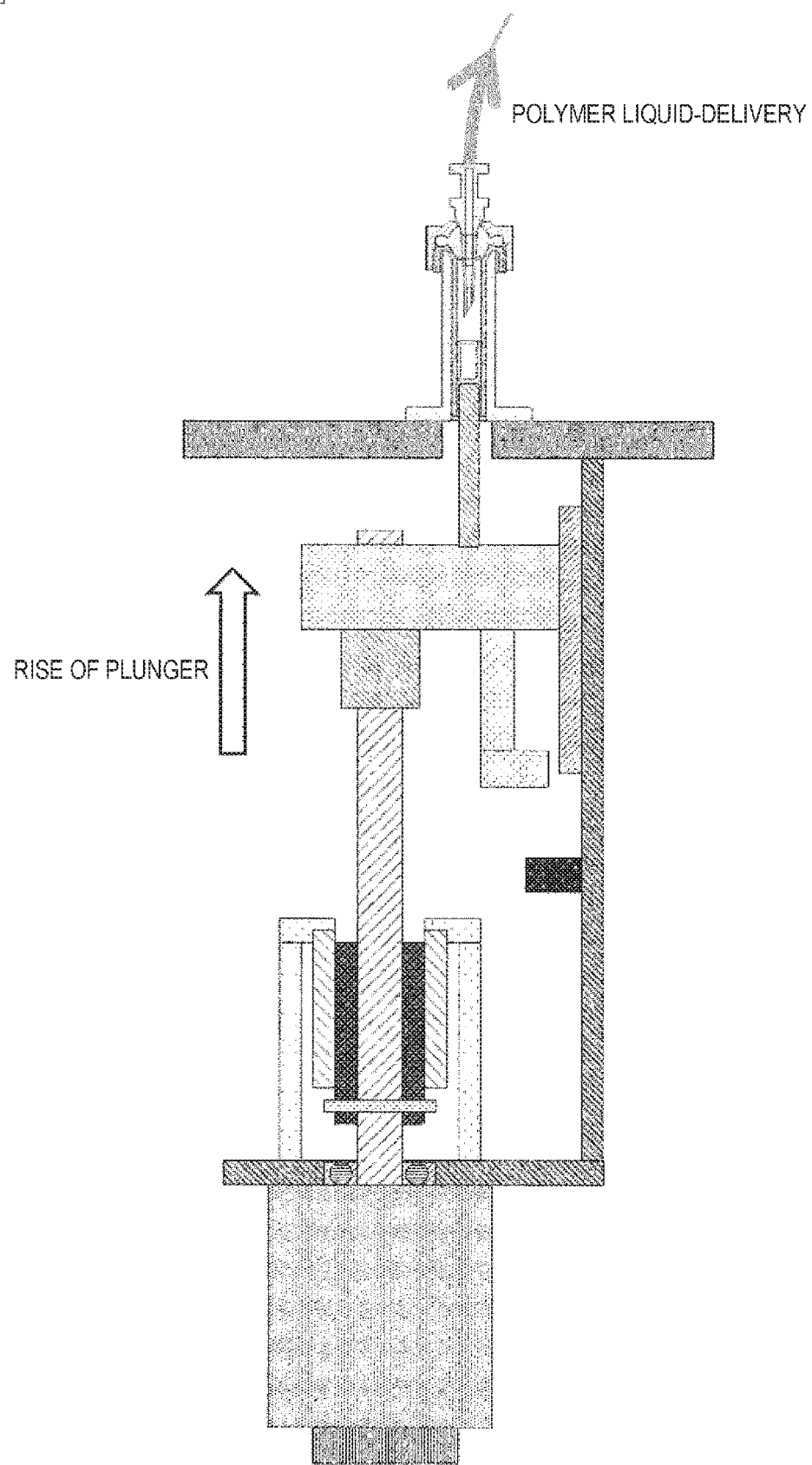

[FIG. 10]
(a)
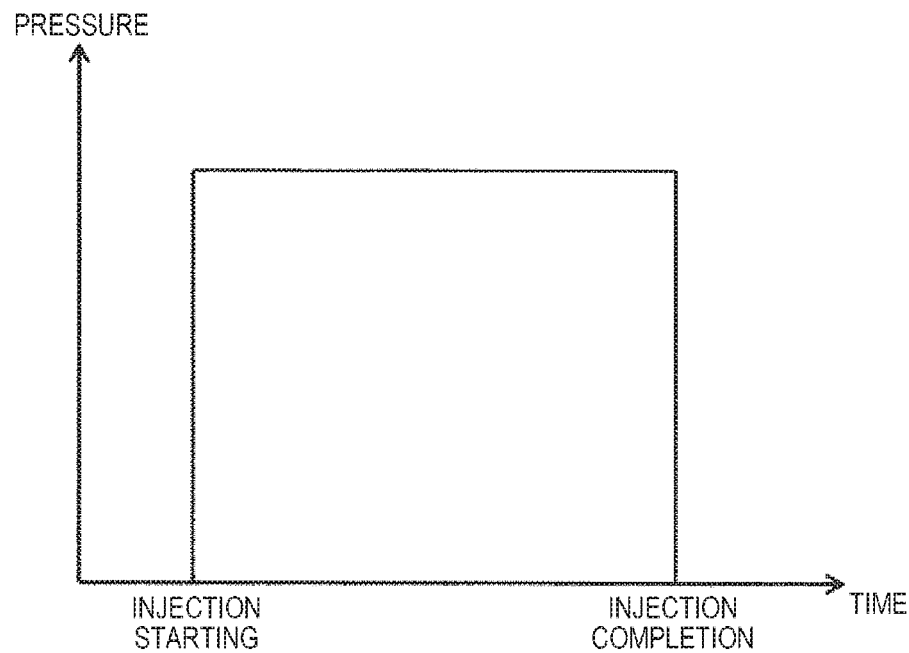
(b)
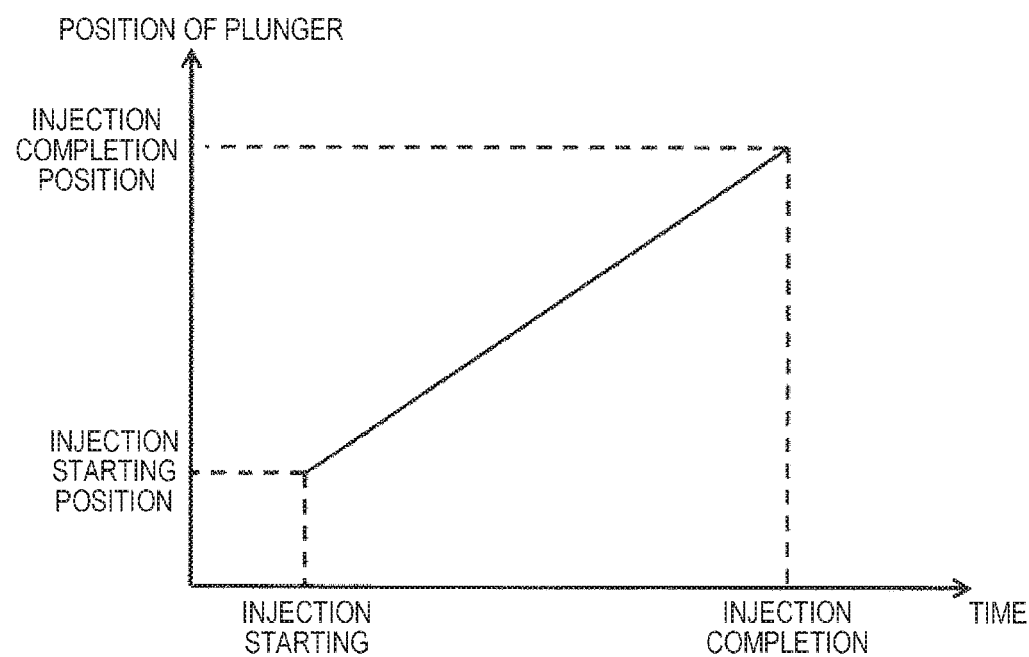

DRIVE SCREW DEVICE, LIQUID DELIVERY MECHANISM, AND LIQUID DELIVERY METHOD

TECHNICAL FIELD

The present invention relates to a capillary electrophoresis device and a liquid delivery mechanism suitable for the electrophoresis device. Particularly, the invention relates to an electrophoresis device which fills a capillary or a capillary array with a gel or a fluid polymer solution which is an electrophoretic medium to be a separation medium and a pump mechanism suitable for the electrophoresis device.

BACKGROUND ART

PTL 1 and PTL 2 disclose an electrophoresis device in which a capillary array including sixteen capillaries is used. The capillary is a thin tube of which an inner diameter is tens to hundreds of microns, and the main material is quartz. The outside of the quartz is coated with polyimide of which a thickness is about tens of microns, so as to impart mechanical strength. During electrophoresis, the capillary is used in the state of being filled with a component serving as a sample separation medium.

As the electrophoresis separation medium, a non-fluid crosslinking polymer was used. However, an uncrosslinked fluid polymer solution excellent in productivity and performance stability becomes the mainstream in recent years. PTL 1 discloses a pump mechanism for filling the capillary with gel or polymer which is a sample separation medium. As the pump mechanism, a glass syringe is disclosed. In addition to the glass syringe, an electrophoresis device which includes the pump mechanism driving a plunger is also present.

In the electrophoresis device, the filling is performed at a high pressure to fill the capillary of which an inner diameter is tens to hundreds of microns with a fluid polymer having high viscosity generally. This is because when the pressure is low, it takes time to fill the polymer, and the processing capability of the device is deteriorated. In addition, the polymer is filled at each measurement in order to prevent the variation and deterioration of the performance. The pump mechanism capable of stably generating a high pressure is required in order to shorten an analysis time and improve the processing capability of the device.

In PTL 3, a method of using a spring is disclosed as a method of generating the pressure for polymer filling. In the method, the characteristic of the spring is used such that a force of extending at the time when the spring is compressed is used to feed liquid.

In PTL 2, a method of using a stop torque of a motor is disclosed as a method of generating the pressure for the polymer filling. In the method, the characteristic of a DC motor is used in which as the load torque increases, the number of rotations decreases, and eventually the rotation stops.

Specifically, the pressure is controlled by repeating the following steps. (1) When the pressure in the syringe increases to a desired pressure, the load torque increases, and the DC motor stops. (2) When the polymer advances into the capillary, and the pressure in the syringe decreases, the motor starts to rotate. In this case, the torque characteristic is controlled by adjusting the value of the current flowing in the motor such that the motor stops at a desired pressure. The desired pressure is typically set to such a degree that leakage and damage do not occur in the flow passage system. In addition, an electrophoresis device is also provided in which a method similar to the above method is realized by a stepping motor.

CITATION LIST

Patent Literature

PTL 1: JP-A-2001-281221
PTL 2: JP-A-2001-324473
PTL 3: JP-A-2008-298670

SUMMARY OF INVENTION

Technical Problem

An object to the invention is to provide a device and a method in which a pressure at a time of filling a capillary array with a phoretic medium is stabilized, and a variation of a liquid delivery amount is reduced.

Solution to Problem

A drive screw device of the invention includes: a drive screw; a drive unit which causes the drive screw to rotate; a slider which moves along the drive screw by means of the rotation of the drive screw; and an external load which is provided on the drive screw and applies a rotational load to the drive screw.

Advantageous Effects of Invention

The pressure at the time of filling the capillary array with the phoretic medium can be stabilized, and the variation of the liquid delivery amount can be reduced.

BRIEF DESCRIPTION OF DRAWINGS

FIG. 1 is a perspective view illustrating a basic configuration of an electrophoresis device including a phoretic medium injection mechanism.

FIG. 2 is a top view illustrating the basic configuration of the electrophoresis device including the phoretic medium injection mechanism.

FIG. 3 is a sectional view illustrating the basic configuration of the electrophoresis device including the phoretic medium injection mechanism.

FIG. 4 is a view illustrating the basic configuration of the capillary array.

FIG. 5 is a detail view illustrating a phoretic medium container.

FIG. 6 is a configurational view illustrating a first embodiment of a plunger drive mechanism.

FIG. 7 is a detail view illustrating a liquid delivery operation of the phoretic medium (initial state).

FIG. 8 is a detail view illustrating the liquid delivery operation of the phoretic medium (the start of the injection of the phoretic medium).

FIG. 9 is a detail view illustrating the liquid delivery operation of the phoretic medium (the completion of the injection of the phoretic medium).

FIGS. 10($a$) and 10($b$) are views schematically illustrating changes in a pressure and a plunger position over time in the first embodiment.

DESCRIPTION OF EMBODIMENTS

In an electrophoresis device, a capillary of which an inner diameter is tens to hundreds of microns is filled at a high pressure to fill a fluid phoretic medium having high viscosity generally. This is because when the pressure is low, it takes time to fill the phoretic medium, and the processing capability of the device is deteriorated. In addition, the phoretic medium is filled at each measurement in order to prevent the variation and deterioration of the performance. The pump mechanism capable of stably generating a high pressure is required in order to shorten an analysis time and improve the processing capability of the device.

Since expensive fluid polymer is filled generally, desirably, the liquid delivery amount of the phoretic medium is stabilized, and the amount of consumption is suppressed, so as to suppress a running cost. For this reason, it is necessary to stabilize the liquid delivery pressure.

In the plunger actuator of the conventional electrophoresis device, the generated torque of the motor is converted into a thrust by a drive screw, and a pressure is generated in a phoretic medium container by the thrust, so as to feed a liquid. In the process of converting the generated torque into the thrust, as the frictional force specific to the drive screw becomes larger, the generated thrust is affected further by the fluctuation of the frictional force. However, the liquid delivery reaction can be held by the frictional force.

In a device which injects several µL of phoretic medium, a seal diameter of a syringe type phoretic medium container is small. Thus, the generated pressure is largely affected by the fluctuation of the generated thrust. Since the fluctuation of the generated pressure results in the variation of the liquid delivery amount of the phoretic medium, the control of the frictional force is important also in the stabilization of the liquid delivery amount.

The frictional force of the drive screw is fluctuated when the drive screw is used continuously. The frictional force is affected by the surface state. Thus, a countermeasure not to change a machine tool or the like is performed in order to manage the surface state, and a periodic pressure adjustment maintenance is required without the production cost increase or an alternative production method, which is problematic.

Therefore, an object of the invention is to provide an electrophoresis device in which a pressure stabilized at the time of filling the capillary array with the phoretic medium can be obtained, and the variation of the liquid delivery amount is reduced to suppress the running cost and to provide a liquid delivery mechanism in which a high discharge pressure can be generated stably.

First Embodiment

FIG. 1 is a view illustrating the configuration of the capillary electrophoresis device into which the invention is applied. This device can be largely divided into two units which are an automatic sampler unit 117 at the lower portion of the device and an irradiation detection/thermostatic bath unit 118 at the upper portion of the device.

In the automatic sampler unit 117, a Y-axis drive body 109 is mounted on a sampler base 108 and can be driven on a Y-axis. In the Y-axis drive body 109, a Z-axis drive body 110 is mounted and can be driven on a Z-axis. A sample tray 112 is mounted on the Z-axis drive body 110, and a phoretic medium container 102, an anode side buffer solution container 103, a cathode side buffer solution container 104, and a sample container 105 are set on the sample tray 112 by a user. The sample container 105 is set on an X-axis drive body 111 mounted on the sample tray 112, and only the sample container 105 can be driven on an X-axis on the sample tray 112. The liquid delivery mechanism 106 is also mounted in the Z-axis drive body 110. The liquid delivery mechanism 106 is arranged below the phoretic medium container 102.

The irradiation detection/thermostatic bath unit 118 has a thermostatic bath unit 113 and a thermostatic bath door 115, and the inside can be maintained at a constant temperature. An irradiation detection unit 116 is mounted behind the thermostatic bath unit 113, and can perform the detection during the electrophoresis. In the thermostatic bath unit 113, the user sets a capillary array 101. The electrophoresis is performed while the capillary array 101 is maintained at a constant temperature by the thermostatic bath unit 113, and the detection is performed by the irradiation detection unit 116. In addition, an electrode 114 for dropping the voltage to GND at the time of applying a high voltage for the electrophoresis is also mounted in the thermostatic bath unit 113.

As described above, the capillary array 101 is fixed in the thermostatic bath unit 113. The phoretic medium container 102, the anode side buffer solution container 103, the cathode side buffer solution container 104, and the sample container 105 can be driven on an YZ-axis by the automatic sampler unit 117, and only the sample container 105 can be driven further on X-axis. In the fixed capillary array 101, the phoretic medium container 102, the anode side buffer solution container 103, the cathode side buffer solution container 104, and the sample container 105 can be automatically connected in an arbitrary position by the movement of the automatic sampler unit 118.

FIG. 2 is a view illustrating the capillary electrophoresis device when viewed from the upper surface. The anode side buffer solution container 103 set on the sample tray 112 has an anode side cleaning layer 201, an anode side electrophoresis buffer solution layer 202, and a sample introduction buffer solution layer 203. In addition, the cathode side buffer solution container 104 has a waste liquid layer 204, a cathode side cleaning layer 205, and a cathode side electrophoretic buffer liquid layer 206.

The phoretic medium container 102, the anode side buffer solution container 103, the cathode side buffer solution container 104, and the sample container 105 are arranged in the illustrated positional relation. Accordingly, the positional relation of the anode side and cathode side at the time of connection with the capillary array 101 becomes a positional relation of "the phoretic medium container 102 and the waste liquid layer 204", "the anode side cleaning layer 201 and the cathode side cleaning layer 205", "the anode side electrophoresis buffer solution layer 202 and the cathode side electrophoretic buffer liquid layer 206", and "the sample introduction buffer solution layer 203 and the sample container 105".

FIG. 3 is a sectional view taken along line A-A of FIG. 2. The phoretic medium container 102 is set to be inserted into a guide 301 embedded in the sample tray 112. In addition, in the liquid delivery mechanism 106, a plunger 601 built in the liquid delivery mechanism 106 is arranged below the phoretic medium container 102.

At the time of the electrophoresis, the right side of the capillary array 101 in FIG. 3 indicates the cathode side, and the left side indicates the anode side. The automatic sampler unit 117 moves to the position of "the anode side electrophoresis buffer solution layer 202 and the cathode electrophoretic buffer liquid layer 206", and the high voltage is applied to the capillary array 101 on the cathode side to flow to GND to the electrode 114 through the cathode side buffer solution container 104 and the anode side buffer solution container 103, such that the electrophoresis is performed.

FIG. 4 is a detail view illustrating the capillary array 101. The capillary array 101 has a capillary 401 which is a glass tube of which an inner diameter is about φ50 μm, and a detection part 402 is attached to the capillary 401. The detection part 402 is detected by the irradiation detection unit 116. A load header 406 and SUS pipes 407 are attached to the cathode side end portion of the capillary 401. As a material of the load header 406, for example, a PBT resin which is a resin having a high insulating property and a high comparison tracking index is desirable. A component which attains conducting of all the SUS pipes 407 is built in the load header 406, and a high voltage is applied to the component to apply the high voltage to all the SUS pipes 407. The capillaries 401 penetrate and are fixed to the SUS pipes 407, respectively. On the anode side, a plurality of capillaries 401 are tied together by a capillary head 403. The capillary head 403 includes a capillary head distal end 405 which has a needle shape at an acute angle and a capillary head boss 404 which is a portion of which an outer diameter is larger than that of the capillary head distal end 405. As a material of the capillary head 403, a PEEK resin or the like which is a resin having stiffness to be hardly broken and high stability against chemicals and analysis is desirable.

Although not illustrated in the drawings, when the capillary array 101 is fixed in the thermostatic bath unit 113, each of the detection part 402, the load header 406, and the capillary head 403 is fixed. The detection part 402 is positioned with high accuracy so as to be detected by the irradiation detection unit. The load header 406 is fixed to be conducted with a part to which a high voltage is applied at the time of being fixed. In the capillary head 403, the capillary head distal end 405 is directed directly downward, and the capillary head is firmly fixed to withstand a load. In the positional relation of the cathode side and the anode side at the time of fixing, the plurality of capillaries 401 are arranged not to overlap with each other at the time of being set in the device.

FIG. 5 is a detail view illustrating the phoretic medium container 102. In the phoretic medium container 102, a seal 502 having a recessed shape is built in a syringe 501, and the container is sealed with a cap 504 by placing a rubber stopper 503 from above. The upper portion of the cap 504 is further sealed with a film 505. The material of the syringe 501 is desirably a PP resin or the like which is a resin which can be thinly molded. The material of the seal 502 is desirably an ultrahigh molecular PE resin or the like which is frequently used for the sealing of liquid in a sliding portion and has an excellent sliding property. The material of the rubber stopper 503 is desirably a silicon rubber or the like which is stable with respect to analysis. The material of the cap 504 is desirably a PC resin or the like in order to be uniform with the film 505 of each container. In the phoretic medium container 102, the phoretic medium 506 is enclosed, and air 507 which enters during enclosing is enclosed so as to be accumulated at the upper portion. The phoretic medium 506 is enclosed in an amount with which the analysis can be performed a plurality of times. When a load is applied from the outside, the seal 502 can operate the inner portion of the syringe 501.

FIG. 6 is a schematic view illustrating the liquid delivery mechanism 106 in this embodiment. A stepping motor 613 rotates in response to the number of input pulses to rotate a drive screw 602 and to move a lead screw 604 straight. The driving method of the stepping motor 613 is one-or-two phase excitation, for example. The lead screw 604 is coupled with a slider 603, and the slider 603 is coupled with the plunger 601. The position of the plunger 601 is controlled by a rotary encoder 614 integrated with the stepping motor 613. The slider 603 is connected with a linear guide 609 and is movable in the axial direction of the drive screw 602. The slider 603 is coupled with a detection plate 610 and is detected by a sensor 611 fixed in a liquid delivery mechanism base 612. The detection position of the sensor 611 is the origin position of the plunger 601.

An external load for applying the rotational load is attached in the drive screw 602. In this embodiment, a torque limiter 615 is used. The torque limiter 615 has a structure in which an inner ring 607 and an outer ring 606 are fitted coaxially. The inner ring 607 of the torque limiter 615 has a hollow structure. In addition, the inner ring 607 and the outer ring 606 can be rotated separately. A constant rotational resistance is present between the inner ring 607 and the outer ring 606. As a method for applying the rotational resistance, a magnet type which is hard to be affected by abrasion is preferable. The drive screw 602 penetrates the hollow portion of the inner ring 607 to be fitted with the inner ring 607 by a parallel pin 608 vertically penetrating the drive screw 602, whereby the drive screw 602 and the inner ring 607 are rotated synchronously. The outer ring 60 is fixed so as not to be rotated by a torque limiter outer ring presser 605 fixed in the liquid delivery mechanism base 612. By such a structure, the resistance can be given to the drive screw 602. For example, the torque limiter 615 requiring a torque of 45 mN·m at the time of fixing the outer ring 606 and rotating the inner ring 607 is used.

Then, the description will be given about a procedure for the injection of the phoretic medium 506. In addition, FIGS. 7 to 10 illustrate the positional relation of the plunger 601, the phoretic medium container 102, and the capillary head 103 at each point. Incidentally, in the description, a direction of pushing the plunger 601 to the phoretic medium container 506 is set as a normal rotation of the stepping motor 613, and a direction of pulling out the plunger 601 is set as an inverse rotation of the stepping motor 613.

FIG. 7 is a view illustrating an initial state which is a series of movements of an injecting operation of the phoretic medium 506. As described above, the phoretic medium container 102 is set by being inserted into the guide 301 embedded in the sample tray 112. At this time, the plunger 601 of the liquid delivery mechanism 106 is arranged directly under the phoretic medium container 102, and the seal 502 in the phoretic medium container 102 can be operated by the movement of the plunger 601.

FIG. 8 is a view illustrating an injection starting state of the phoretic medium 506 which is a series of movements of the injecting operation of the phoretic medium 506. After the capillary head 403 is connected, the plunger 601 is driven by the liquid delivery mechanism 106 so as to operate the seal 502, and the volume in the phoretic medium container 102 is changed such that the liquid is fed. At this time, the inside of the phoretic medium container 102 is highly pressurized, and each component of the phoretic medium container 102 expands. Since the phoretic medium container 102 has low stiffness at this time, the amount of expansion is large, and the container becomes unstable. For this reason, the expansion of the phoretic medium container 102 makes a large effect on the sealing property of the phoretic medium 506.

In this regard, the guide 301 suppresses the expansion of the syringe 501. In addition, the capillary head 403 suppresses the expansion of the rubber stopper 503. Further, since the seal 502 has a recessed shape, when the seal 502 expands due to the internal pressure, the shape becomes more sealed. The seal 502 is formed to have a shape or strength easy to expand compared to the syringe 501, and the effect of the expansion of the syringe 501 can be reduced. Specifically, the thickness of the syringe 501 is set to 1 mm, and the thickness of the seal 502 is set to about 0.6 mm, such that a difference is provided in expansion factors. Accordingly, the effect of the expansion on the sealing property is reduced. However, no matter how much the expansion amount is reduced, the expansion amount cannot be removed. The expansion amount is varied so as to affect the management of an amount of liquid delivery.

In this regard, the stepping motor 613 is driven by a driving current which is a pressure required to feed the liquid, so as to drive the plunger 601. The pressure required to feed liquid at this time is set to 3 MPa, and in order to generate the pressure, the driving current of the stepping motor 613 is adjusted such that the thrust of the plunger 601 becomes 75 N. Accordingly, the inside of the phoretic medium container 102 expands, but the stepping motor 613 performs stepping-out when the internal pressure increases as much as needed.

Herein, the stepping-out of the stepping motor 613 is defined. During the injection of the phoretic medium, the stepping motor 613 becomes in a state of being driven at a specified current and a pulse rate. In the plunger 601, the internal pressure of the phoretic medium container 102 is increased to generate the thrust of 75 N. During the liquid delivery, in the phoretic medium container 102, the internal pressure of 3 MPa is generated, and thus in the seal 502, the liquid delivery reaction is generated in a direction of pushing back the plunger 601. Herein, when the thrust for driving the plunger 601 and the liquid delivery reaction are balanced, the rotation of the drive screw 602 stops. When the rotation of the drive screw 602 stops, a constant pulse rate is given to the stepping motor 613, but the stepping motor is not rotated by the pulse rate. The state at this time is referred to as the stepping-out. The stepping-out state of the stepping motor 613 is detected by the rotary encoder 614.

When the stepping motor 613 is stepped out, the phoretic medium container 102 expands, and the internal pressure increases to a set value. Although the stepping-out is detected, the stepping motor 613 continues to drive while stepping out. The phoretic medium 506 gradually feeds the liquid into the capillary 401, and thus the plunger 601 is gradually driven. Further, after it is detected that the phoretic medium container 102 expands, a driven amount of the plunger 601 is detected by the rotary encoder 614, and a required amount of the phoretic medium 506 is sent to the capillary 401. By such a liquid delivery method, the liquid delivery amount can be managed without being affected by the expansion of the phoretic medium container 102.

When the stepping motor 613 is used while stepping out, a moment when there is no driving force occurs. In addition, in this embodiment, the pressure fluctuation with time up to the service life of the device is reduced. Thus, the drive screw 602 is formed such that although the frictional force is fluctuated, the pressure fluctuation, that is, the fluctuation of the thrust is small. This is because the surface of the drive screw 602 is changed with time, and the frictional force, that is, a holding force or the thrust is fluctuated. For example, a sliding screw having a long lead length or a ball screw is used as the drive screw 602 in which the pressure fluctuation with time can be reduced. The drive screw 602 has a linear-rotational motion converting action, and a force to reverse the drive screw 602 is generated by the liquid delivery reaction. When an external load more than the force generated by a linear-rotational motion is applied to the axis, the drive screw 602 is not reversed, and thus the liquid can be fed with suppressing the pressure fluctuation. Therefore, the liquid delivery mechanism can be realized such that the thrust fluctuation of the drive screw 602 with time is reduced, and a constant pressure can be obtained during the liquid delivery.

FIGS. 10(*a*) and 10(*b*) are views schematically illustrating the change of the pressure over time at the time of filling the phoretic medium 506 with this method. FIG. 10(*a*) illustrates the pressure from the start of the injection to the completion of the injection, and FIG. 10(*b*) illustrates the position of the plunger 601. The liquid delivery pressure is a constant pressure from the start to the completion. The position of the plunger 601 is in conjunction with the injection amount of the phoretic medium, and the liquid delivery pressure is almost constant. Thus, the plunger moves at a constant speed. It is detected by the rotary encoder 614 that the plunger 601 moves by a set amount from the injection starting position, and the liquid delivery ends. The phoretic media 506 for plural times of operations are put in the phoretic medium container 102 in advance, and the liquid delivery is repeated as many times as required for filling the capillary 401.

Second Embodiment

A friction type may be used in addition to the magnet type as the method for applying the external load to the drive screw 602 by the torque limiter 615. The external load may be applied not only by the torque limiter 615, but also by a method in which the resistance is applied by applying pressure with the drive screw 602 as the ball screw, the resistance is applied by applying pressure to the linear guide 609, the resistance is applied by the stepping motor 613 with an electromagnetic brake, the surface state of the drive screw 602 is roughened, and a gear ratio is raised in a state where the drive screw 602 and the stepping motor 613 are connected by a gear.

Third Embodiment

The driving method of the stepping motor 613 may be one-phase excitation, two-phase excitation, or microstep in addition to the one-or-two phase excitation.

Fourth Embodiment

The stepping motor 613 and the drive screw 602 may be separate bodies and be connected by coupling. Alternatively, the gear may be connected with both of the stepping motor 613 and the drive screw 602, and the stepping motor 613 may be connected to be folded.

Fifth Embodiment

A solvent such as water and a washing liquid is sealed in the phoretic medium container 102 and is fed to the capillary 401 by the liquid delivery mechanism 106, so as to wash the capillary 401.

REFERENCE SIGNS LIST

101: capillary array
102: phoretic medium container
103: anode side buffer solution container
104: cathode side buffer solution container 105: sample container
106: liquid delivery mechanism
108: sampler base
109: Y-axis drive body
110: Z-axis drive body
111: X-axis drive body
112: sample tray
113: thermostatic bath unit
114: electrode
115: thermostatic bath door
116: irradiation detection unit
117: automatic sampler unit
118: irradiation detection/thermostatic bath unit
201: anode side cleaning layer
202: anode side electrophoresis buffer solution layer
203: anode side sample introduction buffer solution layer
204: waste liquid layer
205: cathode side cleaning layer
206: cathode side electrophoretic buffer liquid layer
301: guide
401: capillary
402: detection part
403: capillary head
404: capillary head boss
405: capillary head distal end
406: load header
407: SUS pipe
501: syringe
502: seal
503: rubber stopper
504: cap
506: phoretic medium
507: air
505: film
601: plunger
602: ball screw
603: slider
604: nut
605: torque limiter outer ring fixing device
606: torque limiter outer ring
607: torque limiter inner ring
608: parallel pin
609: linear guide
610: detection plate
611: origin sensor
612: liquid delivery mechanism base
613: stepping motor
614: rotary encoder

The invention claimed is:

1. A liquid delivery mechanism which feeds a phoretic medium in a container or a washing liquid to a capillary, the mechanism comprising:
a drive screw;
a motor configured to cause the drive screw to rotate;
a slider configured to move along the drive screw by means of a rotation of the drive screw; and
a mechanism which applies an external load drive screw and applies a rotational resistance to the drive screw independently of a frictional force of the drive screw,
wherein a plunger which presses the container toward the capillary is provided in the slider,
wherein the rotational resistance applied to the drive screw is larger than a force of a liquid delivery reaction, caused by an internal pressure of the container of the phoretic medium, for reversing the drive screw that is generated during feeding of the phoretic medium or the washing liquid, and
wherein the mechanism which applies the external load is a torque limiter which is formed by coaxially fitting an inner ring part and an outer ring part.

2. The liquid delivery mechanism according to claim 1, wherein
the motor is a stepping motor.

3. The liquid delivery mechanism according to claim 1, the mechanism further comprising:
a sensor configured to detect an origin position of the plunger.

4. The liquid delivery mechanism according to claim 1, further comprising:
the motor is a stepping motor that is controlled to be stepped out and driven, the stepping motor being stepped out when the rotation of the drive screw stops, a constant pulse rate is provided to the stepping motor, but the stepping motor is not rotated by the pulse rate.

5. The liquid delivery mechanism according to claim 4, further comprising:
a detection part which detects when the stepping motor is in a state of being stepped out.

6. The liquid delivery mechanism according to claim 1, wherein
the inner ring part and the outer ring part are configured to be separately rotatable and a rotational resistance is provided therebetween.

7. The liquid delivery mechanism according to claim 6, wherein
the rotational resistance is generated by magnetic force.

8. The liquid delivery mechanism according to claim 1, wherein
the drive screw is a sliding screw or a ball screw.

9. The liquid delivery mechanism according to claim 1, wherein
the drive screw and the inner ring part are configured to be rotatable synchronously, and
the outer ring part is fixed so as not to rotate.

10. A liquid delivery mechanism which feeds a phoretic medium in a container or a washing liquid to a capillary, the mechanism comprising:
a drive screw;
a motor configured to cause the drive screw to rotate;
a slider configured to move along the drive screw by means of a rotation of the drive screw; and
a mechanism which applies an external load drive screw and applies a rotational resistance to the drive screw independently of a frictional force of the drive screw,
wherein a plunger which presses the container toward the capillary is provided in the slider,
wherein the rotational resistance applied to the drive screw is larger than a force of a liquid delivery reaction, caused by an internal pressure of the container of the phoretic medium, for reversing the drive screw that is generated during feeding of the phoretic medium or the washing liquid, and
wherein the motor is configured to drive the motor in different states including a first state where a thrust of the plunger and the liquid delivery reaction are balanced, a second state where the external load and the liquid delivery reaction are balanced, and a third state where the liquid delivery reaction is larger than the thrust.

11. A liquid delivery mechanism which feeds a phoretic medium in a container or a washing liquid to a capillary, the mechanism comprising:
a drive screw;
a motor configured to cause the drive screw to rotate;

a slider configured to move along the drive screw by means of a rotation of the drive screw; and a mechanism which applies an external load drive screw and applies a rotational resistance to the drive screw independently of a frictional force of the drive screw, wherein a plunger which presses the container toward the capillary is provided in the slider, wherein the rotational resistance applied to the drive screw is larger than a force of a liquid delivery reaction, caused by an internal pressure of the container of the phoretic medium, for reversing the drive screw that is generated during feeding of the phoretic medium or the washing liquid, and wherein the plunger feeds the phoretic medium or the washing liquid to the capillary by pressing the container which is held on a sample tray from below.

12. A liquid delivery method which feeds a phoretic medium in a container or a washing liquid to a capillary by pressing the container by a plunger which is attached to a slider which moves along a drive screw by means of the rotation of the drive screw, wherein a rotational resistance is applied as an external load to the drive screw independently of a frictional force of the drive screw, and a rotational resistance generated by the external load is larger than a force of a liquid delivery reaction, caused by an internal pressure of the container of the phoretic medium, for reversing the drive screw that is generated during feeding of the phoretic medium or the washing liquid, wherein the external load is applied by a torque limiter which is formed by coaxially fitting an inner ring part and an outer ring part.

13. The liquid delivery method according to claim 12, wherein a rotation of the drive screw is controlled such that a stepping motor is stepped out and driven, the stepping motor being stepped out when the rotation of the drive screw stops, a constant pulse rate is provided to the stepping motor, but the stepping motor is not rotated by the pulse rate.

14. A liquid delivery method which feeds a phoretic medium in a container or a washing liquid to a capillary by pressing the container by a plunger which is attached to a slider which moves along a drive screw by means of the rotation of the drive screw, wherein a rotational resistance is applied as an external load to the drive screw independently of a frictional force of the drive screw, and a rotational resistance generated by the external load is larger than a force of a liquid delivery reaction, caused by an internal pressure of the container of the phoretic medium, for reversing the drive screw that is generated during feeding of the phoretic medium or the washing liquid, wherein the drive screw is driven in different states including a first state where a thrust of the plunger and a liquid delivery reaction are balanced, a second state where the external load and the liquid delivery reaction are balanced, and a third state where the liquid delivery reaction is larger than the thrust.

* * * * *